US008747228B2

(12) United States Patent
Beaudoin

(10) Patent No.: US 8,747,228 B2

(45) Date of Patent: Jun. 10, 2014

(54) INTERMEDIARY MODULE FOR GAMING SYSTEMS

(75) Inventor: Nathalie Beaudoin, Drummondville (CA)

(73) Assignee: Nathalie Beaudoin, Drummondville, Quebec (CA)

( * ) Notice: Subject to any disclaimer, the term of this patent is extended or adjusted under 35 U.S.C. 154(b) by 179 days.

(21) Appl. No.: 12/580,907

(22) Filed: Oct. 16, 2009

(65) Prior Publication Data

US 2011/0092293 A1 Apr. 21, 2011

(51) Int. Cl.
*A63F 13/00* (2014.01)

(52) U.S. Cl.
USPC .............................................. 463/42; 463/43

(58) Field of Classification Search
USPC ..................................................... 463/42, 43
See application file for complete search history.

(56) References Cited

U.S. PATENT DOCUMENTS 5,820,459 A 10/1998 Acres et al.
5,971,851 A 10/1999 Pascal et al.
6,104,815 A 8/2000 Alcorn et al.
6,263,392 B1 7/2001 McCauley
6,902,481 B2 6/2005 Breckner et al.
7,337,330 B2 2/2008 Gatto et al.
7,399,229 B2 7/2008 Rowe
7,581,256 B2 8/2009 Cockerille et al.
2003/0069074 A1 4/2003 Jackson
2003/0078103 A1* 4/2003 LeMay et al. .................. 463/43
2004/0053694 A1 3/2004 Rowe
2007/0243934 A1* 10/2007 Little et al. ...................... 463/40
2008/0070666 A1 3/2008 Gatto et al.
2008/0113811 A1 5/2008 Linard et al.
2008/0167132 A1* 7/2008 Gatto et al. ..................... 463/42
2008/0171588 A1 7/2008 Atashband
2008/0234047 A1 9/2008 Nguyen
2009/0017896 A1 1/2009 Page
2010/0190553 A1* 7/2010 Buchholz et al. ............... 463/42

FOREIGN PATENT DOCUMENTS

WO WO03028828 4/2003
WO WO2008051972 5/2008

OTHER PUBLICATIONS

International Search Report dated Jan. 25, 2011.

* cited by examiner

*Primary Examiner* — James S McClellan
(74) *Attorney, Agent, or Firm* — Norton Rose Fulbright LLP

(57) ABSTRACT

There is described an intermediary software module embodied on a computer readable medium and adapted to communicate with a reduced game application for a specific game within a gaming system, the intermediary software module interacting with non-game related hardware devices internal and external to the gaming system and having a decision making engine that has the ability to decide next steps to be taken as a function of a given state of the gaming system.

23 Claims, 8 Drawing Sheets

INTERMEDIARY MODULE FOR GAMING SYSTEMS

CROSS-REFERENCE TO RELATED APPLICATIONS

This is the first application filed for the present invention.

TECHNICAL FIELD

The present invention relates to the field of gaming systems, and more particularly to gaming systems having game applications running on an operating system and that interact with internal and external devices, such as servers.

BACKGROUND

Casinos offer a variety of games of chance. One category of games offered includes gaming machines such as mechanical slot machines, video slot machines, poker machines, keno machines, etc. With the evolution of computers and new technologies, the diversity of games offered has increased significantly.

New games now run on computer technology, and players of these games ask for more complex animations, new features and more excitement for new games. These new games require faster computers and hardware on which the games run. For game developers, developing games on new hardware technology may represent a challenge.

In addition, legacy games are often developed for specific computer systems. Ageing electronic parts that run old legacy games can also become a problem for game manufacturers, casino operators and casinos. In some situations, replacement parts are no longer available. This situation forces game manufacturers to migrate their legacy games to new technologies.

Casinos, are also being asked to better manage their gaming machine environments, such as by having instant information available of all events that happen on the gaming systems. This request for instant accurate information requires central servers to manage gaming machines, query them, control them and produce management reports. This adaptation to existing games puts pressure on game manufacturers to implement standard communication protocols in their games. A game that doesn't have a specific communication protocol implemented will not be able to communicate with a casino server and may be refused in this casino.

These situations are examples of reasons why game manufacturers need to make new games or modify existing games. As in other industries, game manufacturers need to decrease their time to market for their products. Therefore, there is a need for improvements to existing technologies to help them achieve these goals.

SUMMARY

In accordance with a first broad aspect, there is provided a gaming system for use in a gaming environment, the gaming system comprising: a game application comprising a first software module containing instructions for running a specific game, the instructions related to the behavior, personality, and presentation associated with the specific game; a second software module independent from the first software module and adapted for interacting with non-game related hardware devices, and to communicate with the first software module in accordance with received data; a set of hardware devices for game and non-game related events; and an operating system to control the set of hardware devices in order to allow users and the game application to make use of them.

In one example embodiment of the gaming system, the second software module is also adapted for interacting with game related hardware devices in an intelligent manner, similarly to how it interacts with the non-game related devices.

In accordance with a second broad aspect, there is provided a method for operating a gaming system in a gaming environment, the method comprising: accessing a first software module in a game application for game-related behavior and personality and game-related presentation; and accessing a second software module in a game application independent from the first software module when interacting with non-game related hardware devices, the second software module communicating with the first software module in accordance with received data.

In one example embodiment of the method for operating the gaming system, the second software module may also be accessed when interacting with game-related hardware devices.

In accordance with another broad aspect, there is provided an intermediary software module embodied on a computer readable medium and adapted to communicate with a reduced game application for a specific game within a gaming system, the intermediary software module interacting with non-game related hardware devices internal and external to the gaming system and having a decision making engine that has the ability to decide next steps to be taken as a function of a given state of the gaming system.

In accordance with yet another broad aspect, there is provided a network in a gaming environment comprising: at least one gaming system for use in a gaming environment, the gaming system comprising: a game application comprising a first software module containing instructions for running a specific game, the instructions related to the behavior, personality, and presentation associated with the specific game; a second software module independent from the first software module and adapted for interacting with non-game related hardware devices, and to communicate with the first software module in accordance with received data; a set of hardware devices for game and non-game related events; and an operating system to control the set of hardware devices in order to allow users and the game application to make use of them; and at least one server in communication with the gaming system via the second software module, the at least one server and the second software module adapted to communicate using a given communication protocol, whereby the second software module is adapted to relay information from the first software module to the server and from the server to the first software module.

For the purposes of the present description, a "game application" is understood to be a set of computer readable instructions that once loaded and executed in a gaming system will produce a complete playable game, or part of a complete playable game, for a player to play. A playable game, or part of it, is not limited to a single specific set of instructions, it may also use other external sets of instructions or data to produce the result.

A service can be defined as "work done for others" in the context of the gaming system. Various services are offered to the game applications. For example, the intermediary module offers many kinds of services to game applications, some are elementary, others are complex. These services offered are classified in different categories of service, such as a thread service or a specialized function.

An Application Programming Interface (API) defines the interface between a calling application and the called module.

When an application wants to use services or functions from another application or module, it follows a pre-defined specification. Each module that offers services can have its own API that defines all rules, conventions and services offered for use by the calling application.

The personality of a game is understood to refer to characteristics such as graphics, sounds, music, pay tables, and scenario. The personality encompasses all characteristics put together that make the game unique. The behavior of a game is understood to mean the way the game will act or react to specific events in a given situation. For example, when a player pushes a specific button on the gaming system, it will go to a specific Help screen. How the personality and behavior of the game are formatted and delivered to the player is understood to be the presentation of a game. For example, a specific part of the game may be displayed on a second monitor. This relates to presentation.

The present description refers to game related devices and non-game related devices. Non-Game related devices should be understood to include peripherals that are not necessarily linked to a specific game being played, and in some instances may be used in a system other than a gaming system. For example, a bill acceptor used in a gaming system may also be used in a soft drink machine. The function of the device is to accept bills of money and communicate the information to a software module. This function is not necessarily game related as it may be applied to other environments and it can work the same way with different games. Therefore, the bill acceptor is considered to be a non-game related device. Another example is the main controller in a gaming system. The main controller may be a Personal Computer (PC) board with all the electronics pin outs to connect lights and buttons, etc. Even if it is marketed as a gaming board, and sold for this purpose, it can also be used in another environment to control other input/output devices that have nothing to do with gaming. In addition, the gaming board is not game-specific but rather can be used for a plurality of different games. Non-game related devices also encompass peripherals that are not marketed as game devices, such as a regular PC board.

Game related devices encompass peripherals that are intimately related to a specific game generated by the reduced game application, such that their behaviour is influenced by the specific game. For example, the mechanism that drives the reels in a mechanical slot machine. This mechanism will behave in a given way as a function of the game being played. Another example is a secondary display used in certain way for a given game. This device is a game related device in that its behaviour is dictated by the reduced game application. However, game related devices may also be managed by the intermediary module, even if their behaviour is influenced or dictated by the reduced game application.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
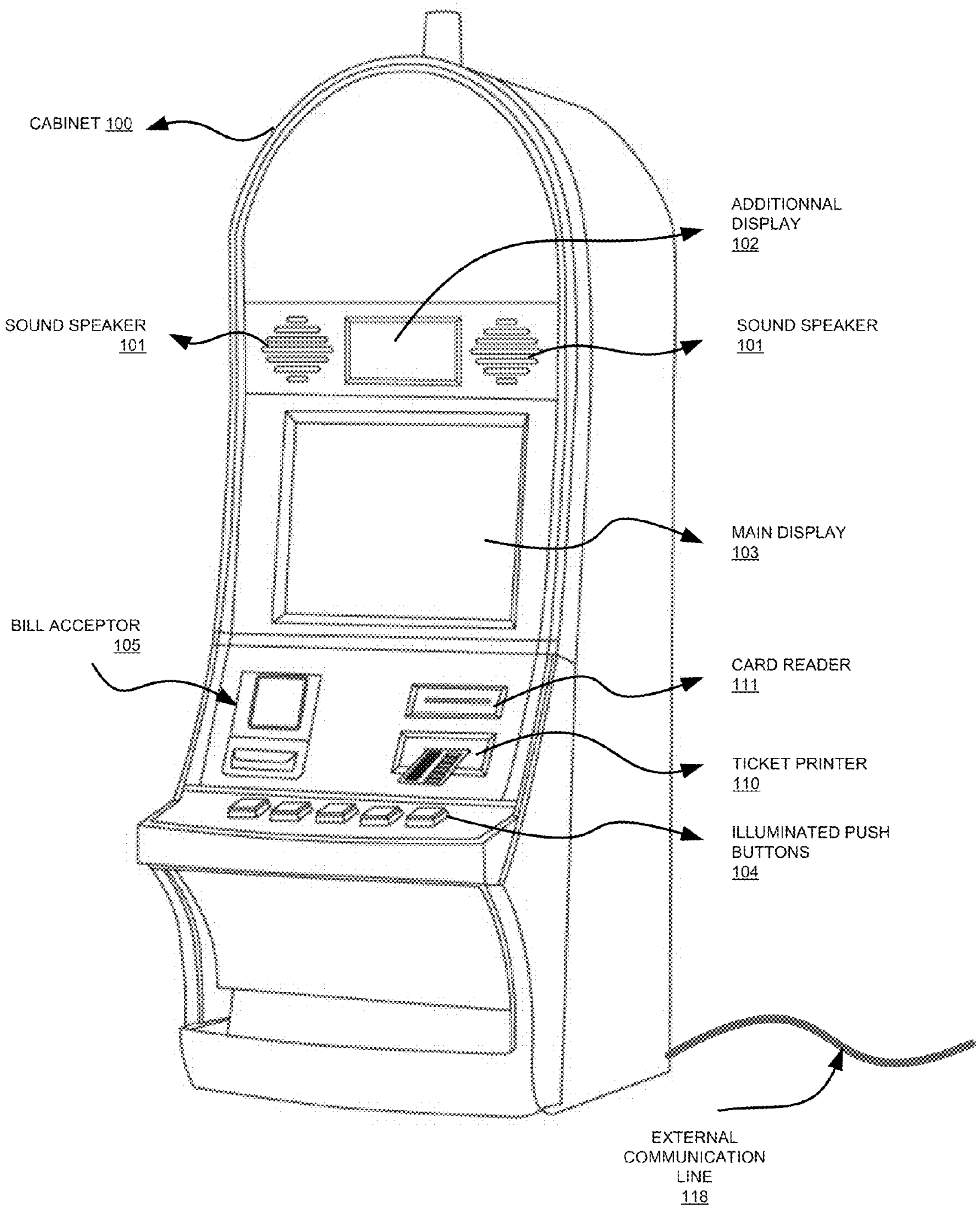
FIG. 1A is a perspective side-view of a gaming system in accordance with one embodiment.
Figure 1B:
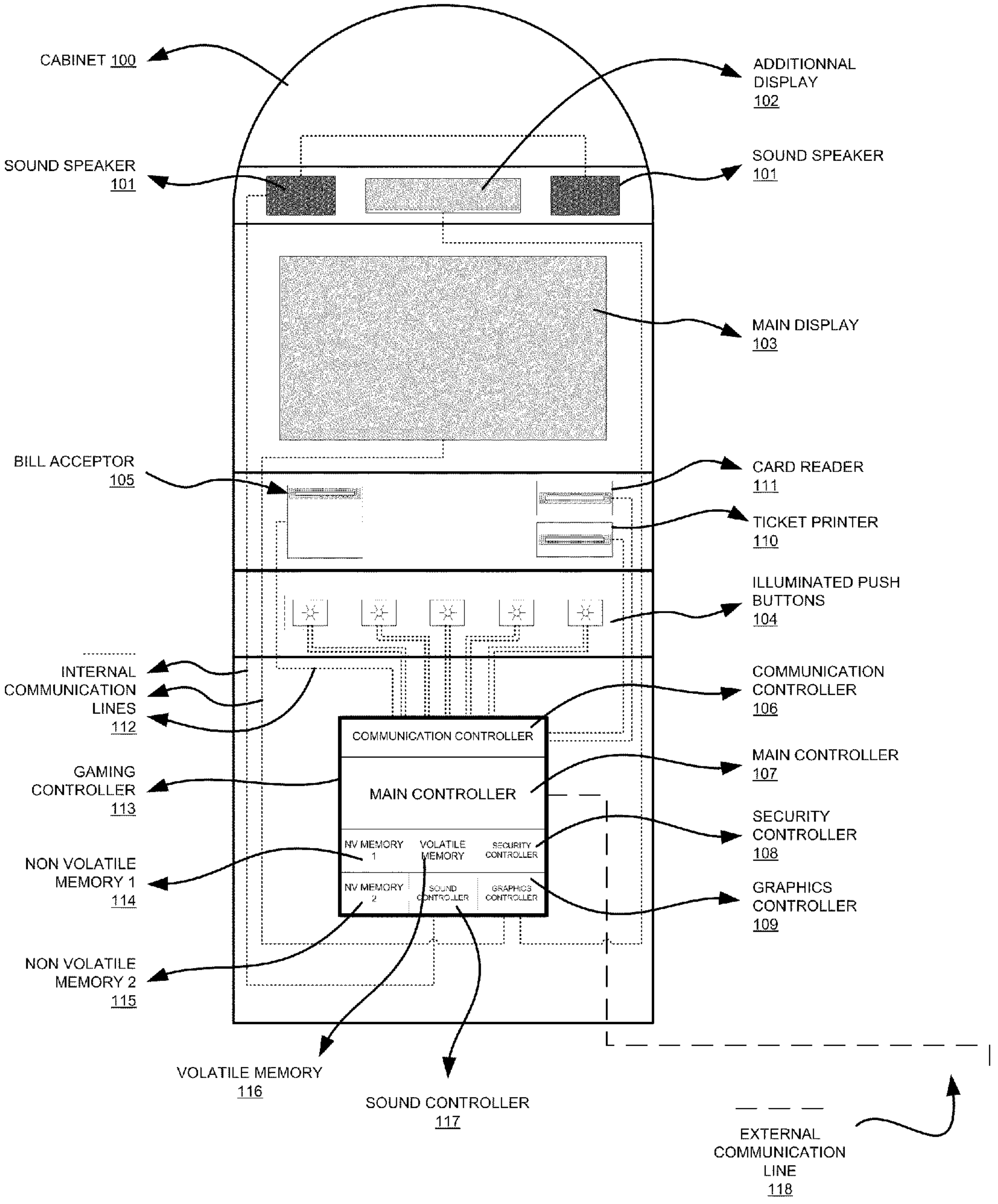
FIG. 1B is a schematic diagram of an exemplary embodiment of a gaming system.

FIGS. 1A and 1B illustrate an example embodiment for a generic gaming system found in casinos. A gaming machine is composed of several parts grouped in a housing 100. These parts have a function, usually related to events input to the game application or actions output to sub components of the gaming system. Some components are used for both input and output. The present description is generic and should not be construed as limiting. In certain instances, some of the described components may be left out and/or other components may be added.

The gaming system is composed of a set of components. A main display is used to display the outcome of the game being played 103. In some embodiments, the main display may be tactile, such as a touch-sensitive screen. Sound speakers 101 output sounds and music. A secondary display 102, which may take any shape, displays additional messages and/or animations to the player. Several components may be present in the gaming system in order to input events. In one embodiment, push buttons 104 are used by the player to make choices or activate an action on the gaming system. In another embodiment, at least some of the push buttons also have a light controlled by the logic of the game program. Other input components may be a card reader 111 to allow a player to identify himself to the game or an operator to activate some functions, and a bill acceptor 105 to input money or tickets into the gaming system. Gaming systems may also have various switches, door locks, lights, etc, to control events on the machine or provide interaction with the player. A token or coin acceptor may also be present, as well as one or more hard meters used as part of a verification system.

The input and output components are connected to one or more controllers or sub-controllers. In some embodiments, these controllers are on different physical electronic components. In other embodiments, all controllers can be on the same electronic component. Element 113 shows an electronic component that includes all sub-controllers. Regardless of how these controllers are physically organized on the electronic components, various functions may be present.

In one embodiment, a main controller 107 includes a main central processing unit, a communication controller 106 provides electronic connections to input and output devices (buttons, lights, switches, etc), and one or more non volatile memory 114, 115 are used to store data, game states, or any piece of information that stays in the machine when powered off. Volatile memory 116 stores information during game play that is lost when the machine is powered off. Sound controller 117 generates output signals to produce sounds. Security controller 108 monitors various events, even when the machine is powered off, for example a door was open. A graphic controller 109 generates signals output to the game displays 103 and/or 102 and ticket printer 110 prints tickets and/or reports. The input and/or output peripherals may be connected to the gaming controller(s) through internal communication lines 112. The gaming system can also be connected to outside systems and/or services and/or other devices through one or several communication lines 118 that go outside the housing 100.

In order to have a complete playable gaming system, software is present on one or more components. Some parts of the software give personality/behavior/presentation to a game (graphics, sounds, outcomes, etc.), while other parts of the software are concerned with interacting with some of the components. The systems and methods described herein apply to any kind of gaming system regardless of how the final result is obtained, i.e. the programming language and the programming platform.

Figure 2A:
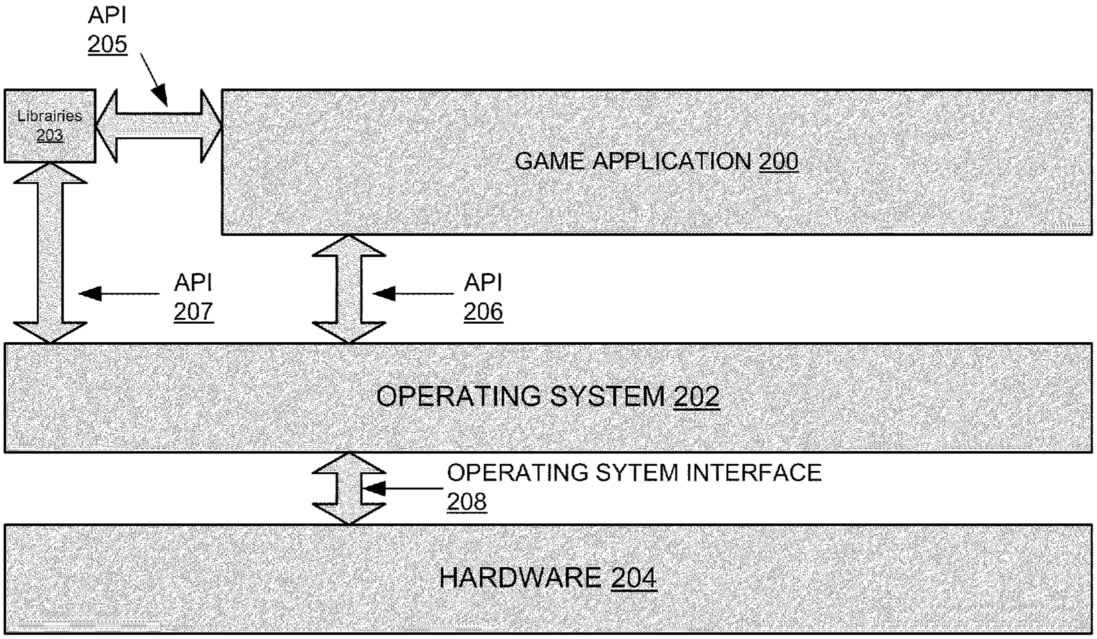
FIG. 2*a* is a block diagram of the organization within a gaming system as per the prior art.

FIG. 2*a*, illustrates the organization of a gaming system in accordance with the prior art. To create a game application, a software developer must first write a program. A program is a list of instructions to control the behavior of a computer, or electronic devices, or components. The program, also called source code, is written in a given language, namely a computer language, understandable by individuals who have the knowledge to read such a language. In order for a computer to understand the source code written by the developer, the source code program must be either compiled or interpreted. This choice depends on which language or technology the developer has chosen.

A game application 200, interacts with the operating system 202 through a pre-defined programming application interface (API) 206 in order to ultimately access various hardware resources 204. The operating system has its own internal operating system interface 208 to access the devices connected to the computer. In some embodiments, a game application 200 can also use functions defined in other libraries 203 through another application programming interface (API) 205. For example, a sound library is a group of functions pre-programmed to output to the sound devices.

Figure 2B:
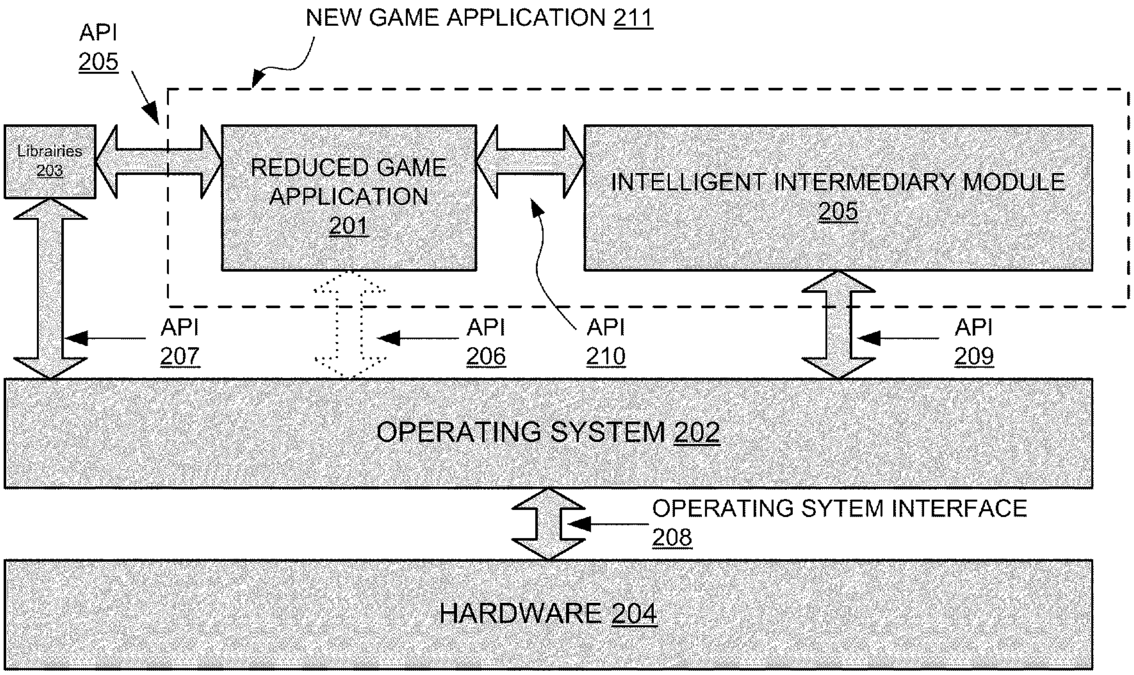
FIG. 2*b* is a block diagram of an exemplary organization within a gaming system including an intermediary module.

FIG. 2*b* illustrates a gaming system in accordance with the embodiments described herein. An intermediary module 205 allows the game application 201 to interact with the outside world, especially as the outside world evolves and changes, and eases and simplifies the software development process of the game application. The reduced game application 201 and the intermediary module 205 form a complete game application 211.

In accordance with one embodiment, the game application 201 can be created by writing new source code. By using the intermediary module 205, the source code and the work to obtain the game application 201 is reduced because some of the functionalities and services previously held by the game application 200 are provided by the intelligent intermediary module 205. The functionalities provided by the intermediary module 205 are accessible through a programming application interface (API) 210. The game application 201 is therefore a reduced game application. The system calls to the operating system 202 needed for game application 200 through the application programming interface 206 may no longer be required. In some embodiments, the intelligent intermediary module 205 may provide the intelligence to avoid direct requests to the operating system 202. After the process of compilation/interpretation, a game application 211 is obtained. The game application 211 may run on the same operating system 202 as that shown in FIG. 2*a*.

In accordance with another embodiment, the programmer can use a legacy source code already written, remove parts of sources codes related to services provided by the intelligent intermediary module 205, and replace it by calls of services through the application programming interface 210 from the intelligent intermediary module 205, in order to obtain a reduced game application 201. The executable game application 211 may be obtained by the same compilation/interpretation process as for FIG. 2*a*. The consequences of doing this on a legacy system are an improvement of the quality/performance of some functions in the game application, the addition of new functionalities nonexistent in the previous legacy codes, and an opening to a new outside world.

In accordance with yet another embodiment, the programmer can use a legacy source code already written and simply add some calls for services provided by the intelligent intermediary module 205. In this case, with very limited additions to the existing source code, the programmer can add many functionalities to the game application, as well as opening it to a new evolving outside world.

In the embodiments described above, the intelligent intermediary module 205 provides "ready to use" and "pre-tested" intelligent services which replace several thousand lines of program code that were previously located inside the legacy game application.

In some embodiments, the intelligent intermediary module 205 eliminates calls made by the legacy program to the operating system through the application programming interface 206 to the operating system 202. In this case, a game manufacturer may then be able to use a given game on another operating system, while keeping the move of technology transparent.

The operating system 202 can be any existing operating system, such as those found on the market or in the open source community. For example, the Microsoft Windows™ family of operating systems can be used, or the Linux™ family of operating systems, as well as other operating systems available, as long as the intermediary module 205 is adapted to be used with the targeted operating system.

Figure 3:
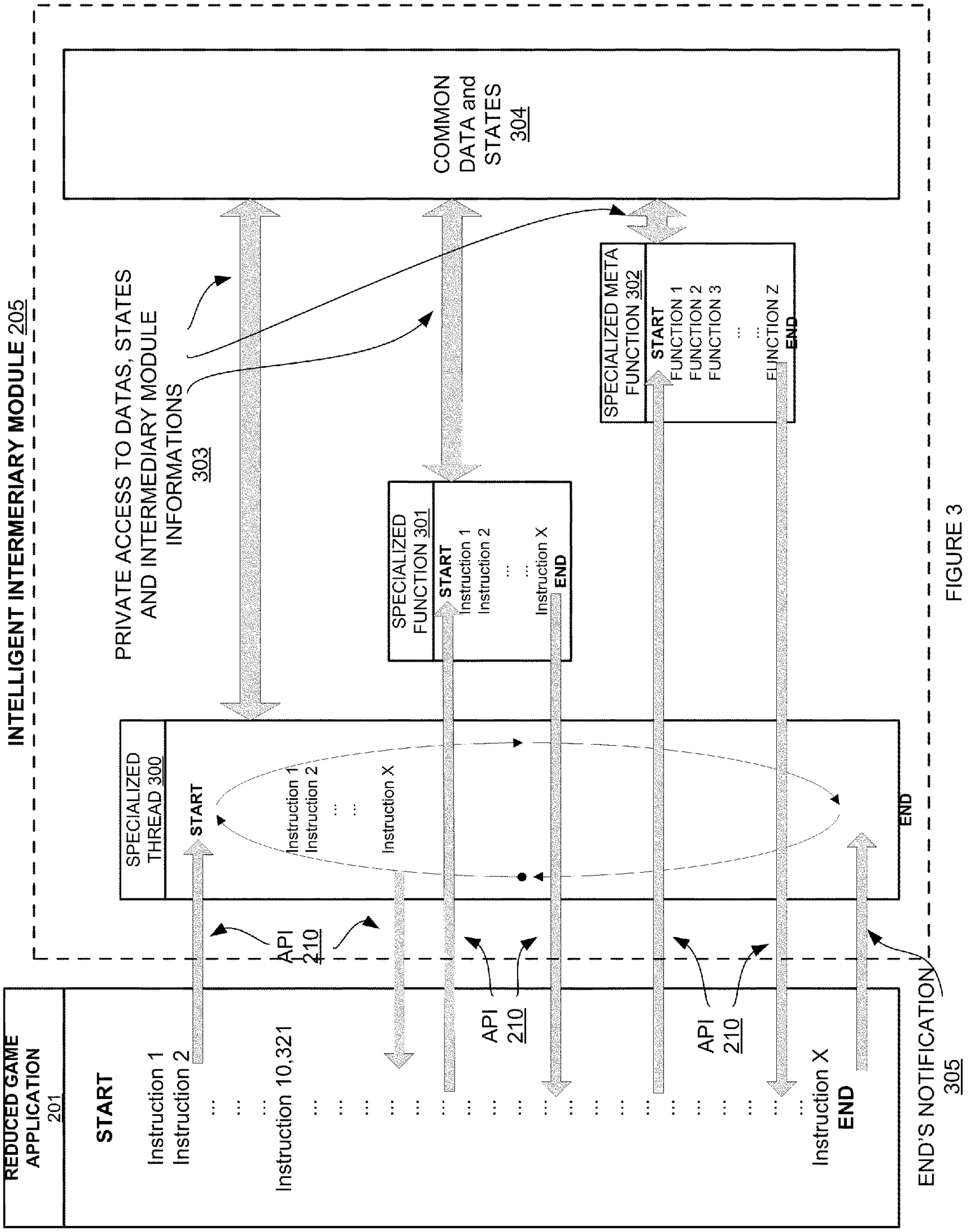
FIG. 3 is a schematic illustrating an interaction between a reduced game application and an intelligent intermediary module, in accordance with one embodiment.

FIG. 3, illustrates an exemplary embodiment of the intermediary module 205 in a game application 211. The game application 201 may use several categories of services from the intermediary module 205. One category of service that may be offered by the intermediary module 205 is the specialized thread service 300. In computer programming, a thread is a child set of computer instructions started from a parent process. The child set of instructions run concurrently to the parent process and will die either when a task is completed or when the parent process dies 305.

In one embodiment of the present system, the game application 201 is a parent process, and a specialized thread service 300 offered by the intermediary module 205 is a child set of instructions. The reduced game application 201 can access the specialized thread service 300 through an application programming interface 210 that defines rules to use this service. Specialized thread services in the intermediary module 205 may also have private access to common data and states 304. These data and states are private to the intermediary module 205, unless the intermediary module 205 gives explicit permission to the reduced game application 201 to have access. This privacy provides protection for theses states and the data. The private data is used for the well-functioning of the game application 211, and some cases, for recovery in the case of a power failure. The private data can reside in any non-volatile memory 115,114, or volatile memory 116 or anywhere else on any component of the gaming system. During its lifetime, the thread service may return data to the reduced game application 201.

Another category of services that may be offered by the intermediary module 205 is the specialized function 301. The reduced game application 201 may access specialized functions through an application programming interface 210. Through the same API 210, at the end of the execution of a given specialized function, data may be returned to the reduced game application 201.

Another category of services that may be offered by the intermediary module 205 is the specialized meta-function 302. The reduced game application 201 may use meta-functions through the API 210. Specialized meta-functions offered in the intermediary module 205 provide the intelligent execution of several sub-tasks depending on the current state of the gaming system or the game application at the time this meta-function is invoked. The behaviour of the meta function can be different each time it is invoked, because the gaming system can be in a different operating state.

For example, a player at a gaming machine decides to "cash out" the money he owns, which means his player account is not at zero. Once the CASH OUT button is activated by the player, the intermediary module will detect from the outside world that the CASH OUT button was pushed. It may then start several sub tasks including but not limited to: turning off the light on the CASH OUT button; disabling the PLAY button; notifying an external server that a cash out action was initiated on the machine; exchanging information with the server; determining the information to put on the ticket (some of this information is part of the common data and states in the intermediary module); printing the ticket on a printer known by the intermediary module (by sending the right codes to the printer); updating several meters in the machine; activating the electro-mechanical meters in the housing; etc. This behavior of the intermediary module 205 is part of the intelligence of the module.

The intermediary module 205 interacts with the outside world of a game application. The outside world of a game application is understood to mean everything that is outside the reduced game application, whether it be inside the gaming system (internal components, sub components, or devices) or outside of the gaming system (external components, sub-components, devices). In some embodiments, the outside world may be the set of physical devices connected inside the gaming system, the sub-components composing the gaming controller 113, or the logical or physical devices or systems outside the gaming systems, connected through communication lines 112,118 to the gaming system.

In one embodiment, a special task may look for a "forced configuration data". This information can be provided to the intermediary module in order for it to know that a specific device, system, or sub-component should be used through the operation of the intermediary module 205. For example, some configuration data may specify that the intermediary module must interact with the outside world through a specific device of make A, model B. This configuration data forces the intermediary module to use this configuration, even if the auto-detect or scan task sees something else, or just does not see anything.

In one embodiment, the intermediary module 205 can also pre-select, auto-detect, or scan the outside world to configure itself. This allows the intermediary module 205 to select a configuration for it to operate. The knowledge of the outside world by the intermediary module 205 adds a level of intelligence to the system and adds a level of abstraction to the reduced game application 201. The reduced game application 201 does not have to know or be concerned with the outside world, the intermediary module having all of the necessary knowledge. For example, the intermediary module may look for all possible devices or components found in the outside world. This can be done by checking for the presence of a piece of information somewhere in the system, or outside the system, by querying these devices, or any other known way to detect the presence of an element in the outside world.

An example of the level of abstraction brought to the game application 201 via the intermediary module 205 is illustrated with the "ticket print" function. A legacy game application needs to know the exact model of a printer installed in a gaming system in order to send to it the right codes and commands. With the abstraction provided by the intermediary module, the game application does not need to know which exact model of printer is in use. The game application just has to invoke the print service, and the intermediary module will take the necessary steps to print a ticket on this specific printer. This ability to adapt itself to the outside world provides an intelligent way to offer services to the game application. In the present example, the change of the printer will not cause a need to modify the game application.

In another example, a scan of the outside world will lead the intermediary module 205 to discover that a specific central server is present on the network of the casino. This discovery of a central server will also indicate to the intermediary module which communication protocol it needs to use in order to communicate correctly with this server. In this case, no information relating to various communication protocols for interacting with a server are needed in the game application 201, as this feature is handled by the intermediary module 205.

In another embodiment, the pre-select, auto-detect, scan process can also use "allowed outside world" configuration data. This data indicates to the intermediary module 205 which kind of device, outside components, or systems can be used in a specific situation. In some embodiments, the configuration data relates to the jurisdiction in which the game application is used, and thereby allows or disallows the use of some devices, components, or systems. The pre-select, auto-detect, scan process can also use "accepted outside world" configuration data. This type of data indicates to the intermediary module 205 which systems, components, device of the outside world the intermediary module 205 is ready to use.

For example, a device of make A, model B is installed in a gaming system. In this example, the game application 201 is configured to be played in a given gaming jurisdiction. The "allowed outside world" configuration data indicates if this device is allowed or disallowed in this given gaming jurisdiction. This authorization or prohibition is another piece of information that can be returned to the game application. The ability of the intermediary module to determine that a specific device or component used in a gaming system is or is not allowed in a specific jurisdiction is another part of the knowledge and intelligence of the intermediary module. It may be up to the gaming application to use it or not.

In another example, the "allowed outside world" configuration data can also be used in the context of rights (license) to use some parts or services of the intermediary module. Another example uses the "accepted outside world" configuration data. For example, a device of make A, model C is in a gaming system. Even if it was detected by the intermediary module, it does not means that the intermediary module is able or ready to use it. The intermediary module may not be ready to use a model C that uses a different set of commands to interact with it. The "accepted outside world" is the information defining this ability of the intermediary module.

From a selected configuration, operating parameters configuration data may also be applied to indicate which outside situation/action will become an event for the intermediary module 205. For example, operating parameters configuration data may define which regions of a touch screen correspond to “buttons”. This configuration data defines positions of all the areas that will, when touched, result in an event. When the screen is touched outside of one of these areas, it will not result in an event for the intermediary module. This configuration data can also be generated, for example, through a configuration utility. A configuration utility is a software tool that may be provided to help the developer generate the operating parameters configuration data. For example, to determine exact positions of a given button on a touch screen, a configuration utility may be used. This tool asks the developer to touch corners of the positions of an area on the touch screen, and will register these parameters. The same concept applies for buttons and lights.

Another example is the configuration data that defines where the lights of a gaming system are connected. A given light is connected to a given output position on an electronic communication board, or on any other hardware piece. Usually, these electronics parts have multiple connections, and the game application must know exactly on which output connection is connected a specific light. The configuration data in this case can define that the play button light is connected to output #6 of the communication board.

Figure 4:
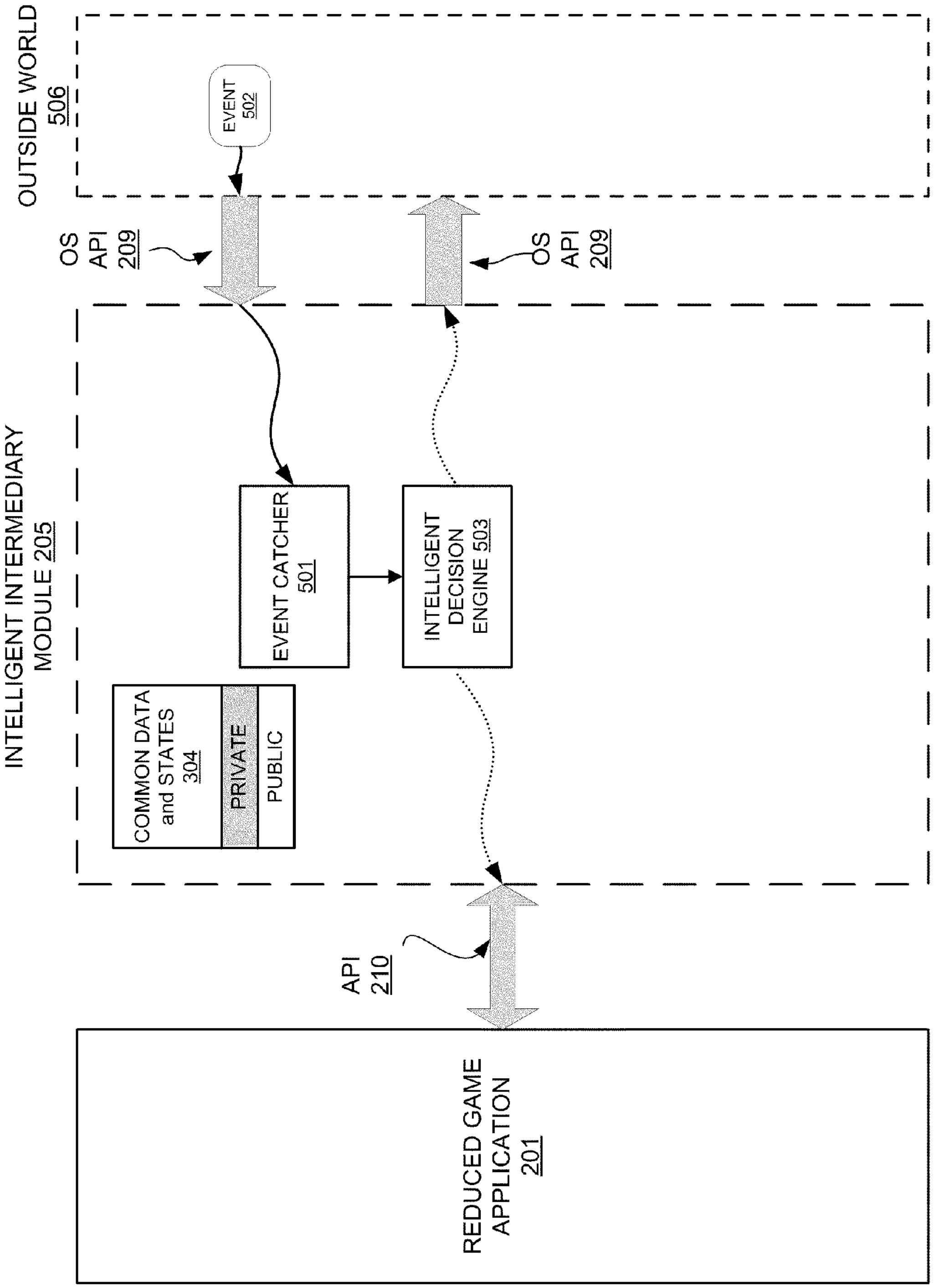
FIG. 4 is a schematic illustrating an interaction of an intermediary module with outside world events, in accordance with one embodiment.

FIG. 4 illustrates how the intelligent intermediary module 205 reacts to events from the outside world 506. When an event 502 occurs in the outside world of the reduced game application 201, an “event catcher” 501 of the intermediary module 205 connected to the outside world through an operating system application programming interface 209 catches this event, analyses it in the context of the current state of the gaming system, and takes a decision. An intelligent decision engine 503 may be used to take this decision and determine the next steps. An action may be taken by the intermediary module 205. This action can also impact the outside world through an application programming interface 209. Following the decision and the optional action, the intermediary module may decide to advise the reduced game application 201 of what just occurred through the API 210. In many situations, the reduced game application 201 does not need to know about external events, as long as the intelligent intermediary module 205 takes the necessary actions to react to this outside world event.

The intermediary module 205 may also have the ability to decide in which order events will be sent to the game application 201. The game application 201 receives events from the intermediary module 205 by retrieving them from a queue of events. If the game application 201 does not retrieve the events, they can be accumulated in this queue of events. If, for example, the queue of events stocks events A, B, C, event A being the next event that will be read by the game application 201, followed by event B, etc, and a priority event X arrives from the outside world, the next event that will be received by the game application 201 may be event X because it is a priority event. The intermediary module 205 has the intelligence and ability to decide what is a priority event and the level of priority. This intelligence may also be determined by some rules, defined in one or more configuration data elements. For the game application 201, it is seen as a single queue of events, but internally in the intermediary module 205, it may be a plurality of event queues (private to the intermediary module 205) that will be scanned in some predetermined order when the game application 201 will ask to have the next event.

The intelligent decision engine 503 is the logic embedded in the intermediary module that has the ability to decide next step(s) in a given context of the system, or state. This logic may be pre-configured through rules, and/or may be configured to learn via other ways. The intelligent decision engine 503 may also be involved when a specialized meta-function is invoked or when other actions are taken by the intermediary module 205.

For example, if the PLAY button of the gaming system is pushed and the machine is already playing a game, a defined rule states that this event in this situation (play in progress) must be ignored. In this case, even if the play button is pushed and the intermediary module catches it, it will decide to do nothing with it, because the machine is already playing.

Another example is when an outside central server communicates with the gaming system to obtain information, such as: “How many games were played on this machine?”. This question asked to the gaming system is received by the intermediary module 205, which analyzes it and decides to answer it. In this case, the answer is taken from the “common data and states” area and the answer is sent back to the server. The intermediary module 205 does not have to inform the game application 201 because there is no need for it to know that such a question was asked.

Another example is when a door is open on the gaming system. The intermediary module is informed of this event (from a door switch) and decides that this event should be communicated to the game application. It then sends this information to the game application through the API. In yet another example, when the PLAY button is pushed during an IDLE state of the game, the intelligent decision engine 503 decides that a game can be started. It then sends this information to the game application and at the same time turns off the light on the PLAY button (action sent the outside world).

In one embodiment, the reduced game application 201 does not have a direct link with the outside world. Therefore, when the outside world evolves or changes, no modification is required in the reduced game application 201.

Figure 5:
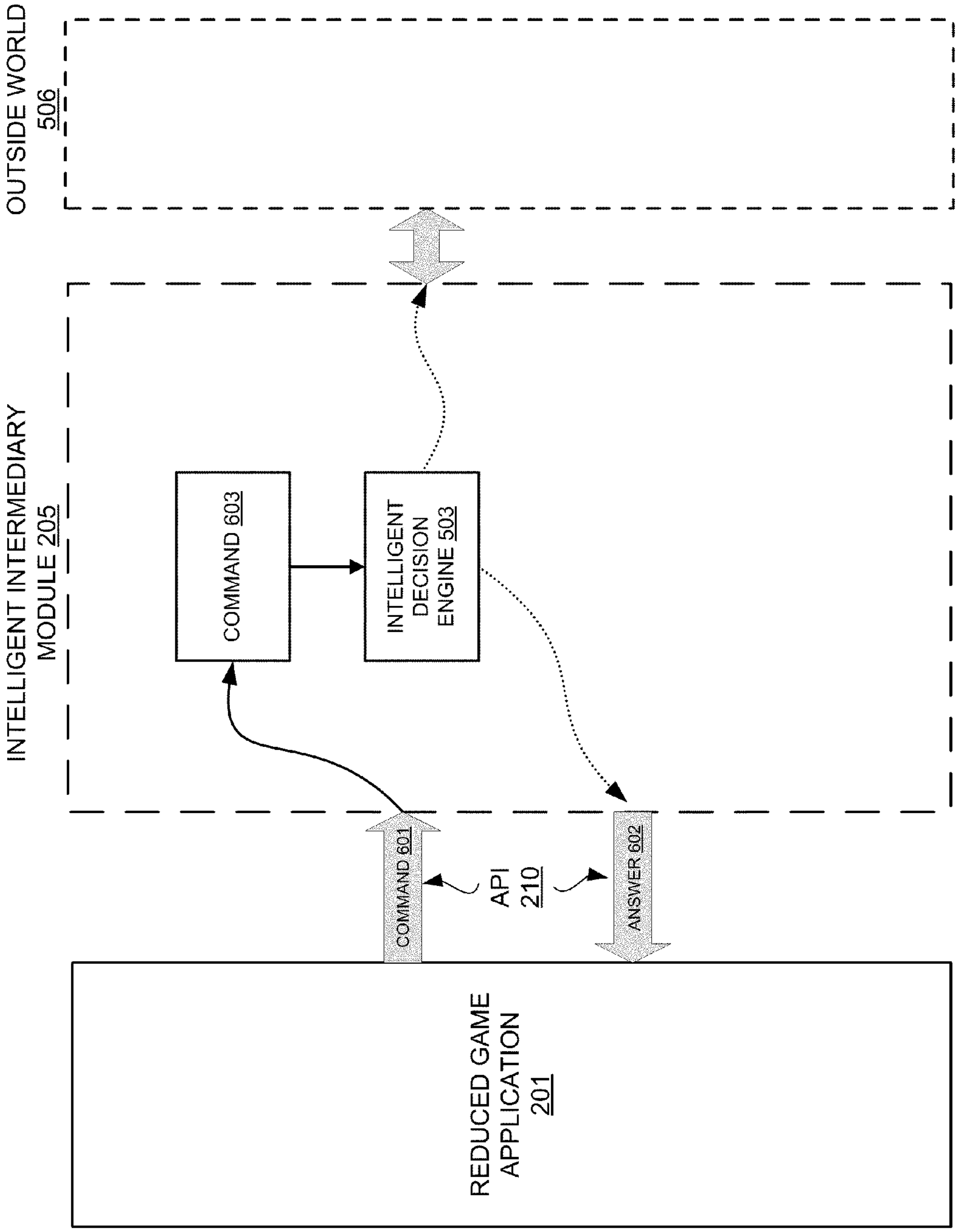
FIG. 5 is a schematic illustrating an interaction of an intermediary module with game application commands, in accordance with one embodiment.

FIG. 5 illustrates how the intermediary module 205 reacts to an action requested by the reduced game application 201. When the game application 201 needs to interact with the intermediary module 205 or with the outside world 506, it issues a specific command 601 pre-determined in an application programming interface (API) 210. The intermediary module 205 analyses the request and makes a decision on how to react to the command. The result of this analysis depends on a gaming system state and a game application state at the time the command is issued. Following the analysis and decision, optional actions may be initiated by the intermediary module 205. An optional notice may be sent to the reduced game application 201 through the API 210. The notice can also be accompanied by additional information.

For example, the game application 201 may send a request via the intermediary module 205 to print a cash-out ticket. The intermediary module 205 receives the command and analyses the current state of the machine. Through this analysis, the intermediary module 205 may ask “Is there any credit in the machine” and then decide whether or not to print a cash-out ticket. The intermediary module 205 may also return a piece of information through the API to the game application 201 to indicate that the ticket was successfully printed, or an error has occurred, or nothing was printed due to the absence of credits in the machine.

In another example, the game application 201 may request the intermediary module 205 to flash a specific light for 5 seconds on the gaming system, perhaps as part of a winning animation. In this situation, the intermediary module 205 determines where the light is physically (which output connection), how it is logically connected to the electronic components, and then performs the necessary action for 5 seconds.

Figure 6:
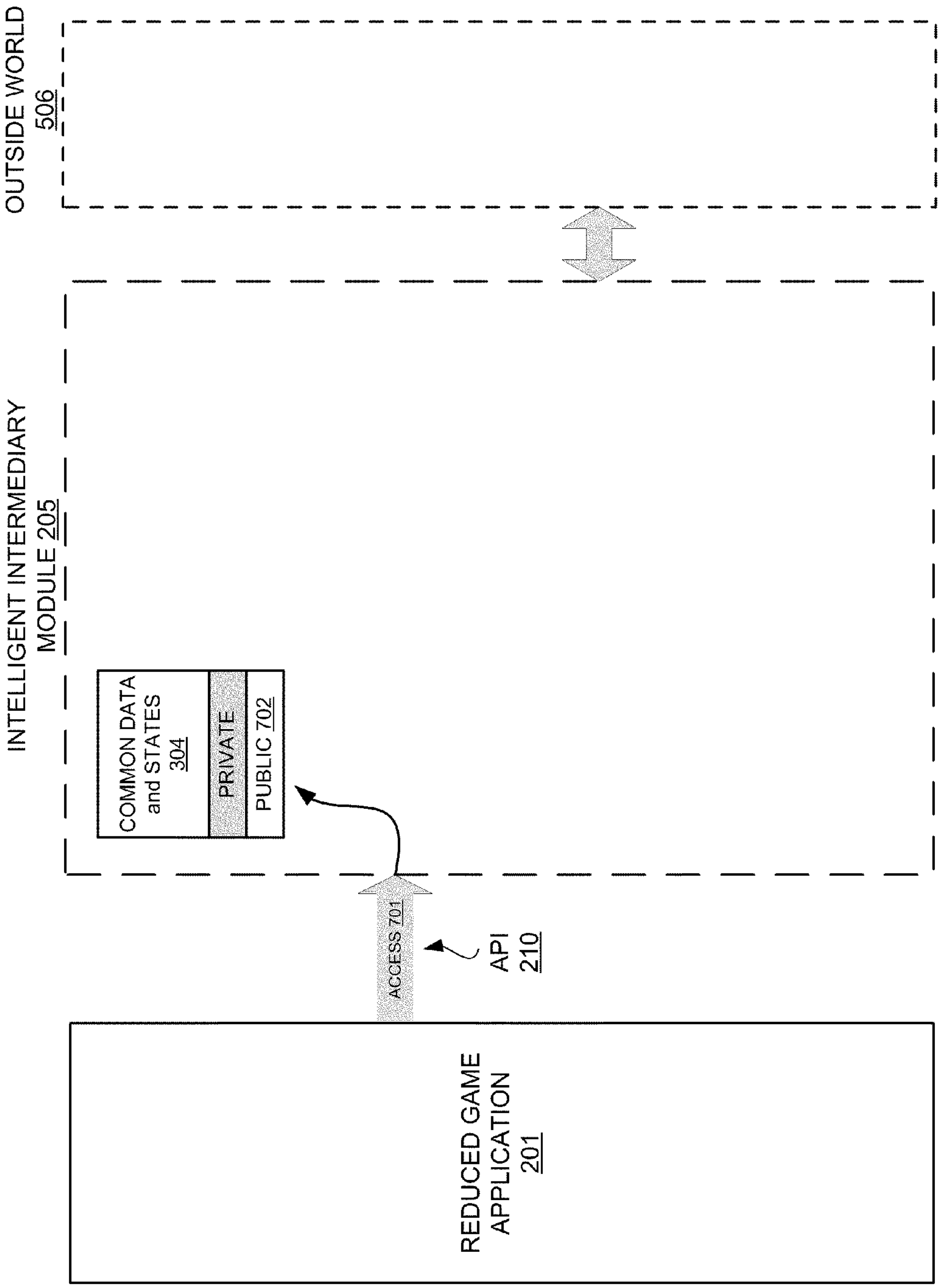
FIG. 6 is a schematic illustrating an intermediary module allowing access to public data, in accordance with one embodiment.

FIG. 6 illustrates how the intermediary module 205 may give access to the game application 201 to some pre-determined internal information. This internal information may come from an internal and/or external component, device, or system. The intermediary module 205 grants this access to the reduced game application 201 through the application programming interface 210.

For example, a very important information for a game application 201 is the player account (the amount of money the player owns). This information can be directly accessed through the API, because it is pre-defined as a public piece of information accessible from an outside entity. This information is part of the common data and states of the intermediary module 205. State information may be configured as public through the API. For example, the state of a door switch indicating if a door is open or closed. This information can be logic data indicating true or false.

In order to illustrate one embodiment of the gaming system, an example of the interaction between the different modules within will be described from the time a player selects a machine to play to the time money is cashed out after play has ended.

When a player arrives in a casino, he walks around, looks at all the different games offered, and chooses a game that appears interesting and/or attractive. The chosen game may be a new game recently installed or an old and well known game. Unattended games sit in an idle state, and may try to attract players by for example, flashing lights and/or displaying various parts of a game on a screen to illustrate the game that can be played. During this phase, the game application 201 is not active as no actual game has been started. The intermediary module 205 recognizes the state as idle and commands the various lights in accordance with the settings of the gaming system. The intermediary module 205 actively monitors all peripherals and devices connected to the gaming machine to recognize if an event compatible with the idle state occurs.

During the game selecting process, a player can go to a machine and either press a HELP button or touch the HELP area on the screen to see the rules of the game and the potential winnings. At this point, the intermediary module 205 registers an event by receiving data from the hardware, namely the display screen or a button. The game remains in an idle state. In one embodiment, the intermediary module 205 may handle this request independently of the game application 201 by returning the requested help and/or winnings information to the game application 201. Alternatively, the intermediary module 205 may advise the game application 201 that a request has been made for this information, and the information is returned to the display by the game application 201, either through the intermediary module 205 or directly to the hardware 204 via an API 206 interfacing with the operating system 202.

Once a machine is selected, before being able to play, the player must add credits in the machine. Credits can take the form of bills, coins, printed tickets, or tokens, inserted into a bill acceptor or a coins acceptor, or a magnetic card inserted into a card reader. The chosen peripheral determines the validity of the currency inserted. When credits are provided to the machine, this information is received by the intermediary module 205 and the state of the machine is changed from Idle to Ready. At this time, the intermediary module 205 may also turn on the light on the play button to show to the player that playing a game is now possible. Given that the game state has changed from "idle" to "ready", pressing the play button will now become an event considered by the intermediary module 205.

The player may have certain choices to make for the game that will be played. These choices can be the denomination (25 cents, 1$, etc) to be wagered, the number of lines he wants to be considered for a winning pattern on a reel machine, the number of cards in a card game, the numbers to play on a keno game, etc. These choices are all game-related and therefore are treated by the game application 201. However, before being treated by the game application 201, the intermediary module recognizes events on the touch screen or from a button and sends this information to the game application 201. For example, a wager of 25 cents may be stored by the game application so that a winning amount can be determined accordingly, should the player be victorious in the game played.

After having made these choices, the player can activate the game by pressing PLAY on the screen, pushing the PLAY button, or pulling a lever on the side of the gaming system. The logic of the game in the game application 201 then determines what the outcome of the game will be. Animations on the screen as well as sound and music are provided as a function of the game by the game application 201. In some embodiments, the player may get access to additional animations, for example, in a bonus round. These gaming-related events are managed by the game application 201.

When the animations are complete, the gaming system displays to the player the outcome of the game, which determines if there are winnings to be collected. In the case of a win, the credits won will be added to the player's account. In some embodiments, the game application 201 may need to call a meta function of the intermediary module 205 (the "win" meta function) to advise it of the winning event. In this case, transparently and in the background, the intermediary module 205 will make all necessary communications with a central server (if configured to communicate with a central server). The intermediary module 205, through its knowledge and intelligence, may also decide if a hand-pay procedure may be called. A hand-pay may be necessary in some jurisdiction if the winning amount is over a certain limit. If this is the case, the gaming application 201 will receive a notification from the intermediary module 205 indicating that a hand-pay is waiting. In this case, the game application 201 will display a message to the player. The intermediary module 205 will then wait for an attendant to come to turn on the reset key, and the intermediary module 205 will advise the game application 201 that the hand-pay is completed.

When the player is done with the game, the remaining credits may be cashed out. This can be done by pressing CASH OUT on the gaming system, either on a push button or on the touch screen. At this time, money is given back to the player. It can be from a hopper who dispenses the money, the printer who prints a ticket, or it can be returned to the player magnetic card. In this situation, the intermediary module 205 registers that the cash-out button has been activated. In some embodiments, the intermediary module may transparently call a meta function ("cash-out" meta function) to make all necessary actions related to a cash-out: communicate with the server, print a ticket, etc, and just return to the game application 201 that the cash-out action is completed with or without success. Additional information may also be returned to the game application 201 indicating an error code for an unsuccessful cash-out action. This is one way to use the intermediary module 205. Another way is to notify the game application 201 that cash-out button was pressed, and let the game application 201 call the "cash-out" meta-function.

Figure 7:
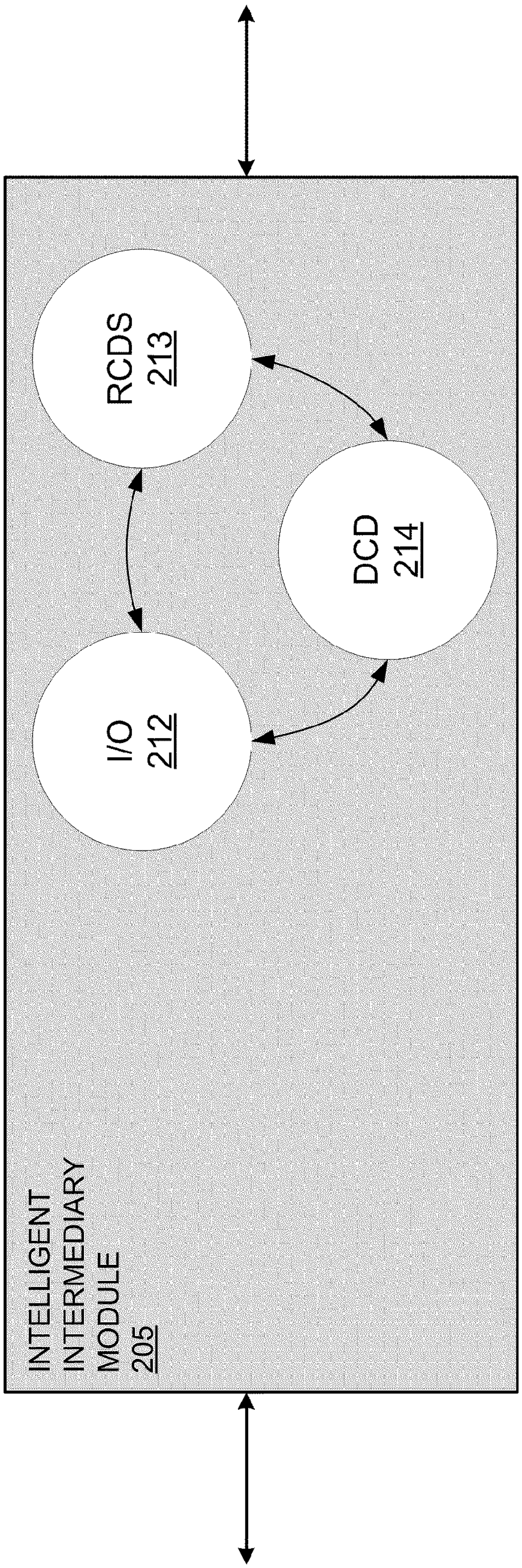
FIG. 7 is illustrates one embodiment of an intermediary module in more detail.

FIG. 7 is an example embodiment of an intelligent intermediary module 205. The intermediary module 205 may interact with one or several types of components/devices. Depending on the configuration of the game application 201 or the intermediary module 205, these interaction features may be used or not used.

The I/O sub-module 212 is responsible for input and output components such as lights, buttons, door switches, etc, that may be connected to the communication controller 106. These devices are passive devices and have little or no intelligence. These types of devices cannot be queried, and complex commands cannot be sent to them. Therefore, the intermediary module 205 selectively activates and deactivates these passive devices using basic commands. In some embodiment, the I/O sub-module 212 may also be responsible for communicating with embedded functions on some electronic controllers. For example, some controllers have a special battery to keep some data in non-volatile memory, or to keep some security functions active while the machine is powered off. These controllers may offer a function to query the status of the battery (charged or discharged). These types of functions embedded in some controllers may be used through the I/O sub-module 212.

The RCDS (Remote Component Devices or Systems) sub-module 213 deals with external components connected to the gaming system through external communication lines. These communication lines may be wireless or not. The external components have some level of intelligence and the intermediary module 205 may have to communicate with these devices with specialized commands/codes and/or one or more communication protocol. For example, the SAS protocol and the G2S protocol are widely used in the gaming industry and the intermediary module 205 may be adapted to communicate with a central server or other devices/systems using one or more of these protocols.

The DCD (Directly Connected Devices) sub-module 214 deals with components internal to the gaming system, such as bill acceptors, printers, etc, that have themselves some form of intelligence and with which the intermediary module 205 may communicate with specialized commands and codes. When the hardware of the gaming system changes, for example a new board, printer, or bill acceptor, the game application 201 does not need to be updated such that it may interact with these new devices. The intermediary module 205, which is independent of the game application 201, may be updated or may already have the capabilities of dealing with these changes.

From the above, it can be understood that the game application 201 is responsible for gaming behavior and personality, and gaming presentation. The game application 201 is responsible for processes that may be different from one game to the other. The intermediary module 205 is responsible for non-gaming related interactions with the outside world, such as coin dispensers, bill acceptors, interactions with a server, changing the state of the gaming machine, and possibly all tasks and process that are common from one game to another (a hand-pay decision and procedure is game related, but does not change from game to game). By removing the non-gaming (or common) related interactions from the game application 201, game developers do not need to be concerned with the ability to function with different models or versions of hardware devices and components within and outside of the gaming system. In addition, these hardware devices and components can be upgraded without making any changes to the game application 201. Furthermore, a game application 201 may not need to be re-certified if changes are made only to the intermediary module 205 and not to the game application 201. In another embodiment, the intermediary module 205 may be a pre-certified component of the game application 211, and it can be combined with any other separately certified reduced game application 201.

In some embodiments, the intermediary module 205 may also be responsible for gaming-related interactions with the outside world, by interacting with game related devices, and/or may also interact with external or remote devices/systems such as servers.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present invention can be carried out as a method, can be embodied in a system, a computer readable medium or an electrical or electro-magnetic signal. The embodiments of the invention described above are intended to be exemplary only. The scope of the invention is therefore intended to be limited solely by the scope of the appended claims.

I claim:

1. A gaming system for use in a gaming environment, the gaming system comprising:
- a game application comprising
  - a first software module containing instructions for running a specific game, the instructions related to the behavior, personality, and presentation associated with the specific game;
  - a second software module independent from the first software module and adapted to interact with game and non-game related hardware devices for interfacing the first software module with an environment outside of the first software module, to receive data indicative of at least one event from the outside environment, and, in accordance with the received data, to generate and communicate the first software module output data for altering a play of the specific game;
- a set of hardware devices for game and non-game related events; and
- an operating system to control the set of hardware devices in order to allow users and the game application to make use of them.

2. The gaming system of claim 1, wherein the second software module comprises a decision making engine that has the ability to decide next steps to be taken as a function of a given state of the gaming system.

3. The gaming system of claim 1, wherein the second software module comprises:
- an input/output sub-module for communicating with input and output passive components;
- an external devices sub-module for communicating with external devices; and
- a directly connected devices sub-module for communicating with directly connected devices.

4. The gaming system of claim 1, wherein the second software module is adapted to communicate with an external server using one of a SAS protocol and a G2S protocol.

5. The gaming system of claim 1, wherein the second software module provides a specialized thread service accessible by the first software module.

6. The gaming system of claim 1, wherein the first software module and the second software module communicate via an application programming interface.

7. The gaming system of claim 1, wherein the second software module provides specialized meta-functions to the first software module.

8. The gaming system of claim 1, wherein the second software module is adapted to auto-configure using one of a pre-select, auto-detect, and scan function.

9. The gaming system of claim 1, wherein the second software module actively monitors peripherals and devices of the gaming system to recognize an event and proceeds in accordance with a set of pre-determined rules for reacting to the event.

10. The gaming system of claim 1, wherein the second software module comprises operating parameters configuration data to manage connections and events.

11. The computing system of claim 1, wherein both the first software module and the second software module are used to produce at least part of a complete playable game.

12. A method for operating a gaming system in a gaming environment, the method comprising:

accessing a first software module in a game application for game-related behavior and personality and game-related presentation associated with a game; and accessing a second software module in a game application independent from the first software module when interacting with game and non-game related hardware devices for interfacing the first software module with an environment outside of the first software module, to receive data indicative of at least one event from the outside environment, and, in accordance with the received data, to generate and communicate to the first software module output data for altering a play of the specific game.

13. The method of claim 12, further comprising updating the second software module when a change in hardware is made to the gaming system, without making changes to the first software module.

14. The method of claim 12, further comprising having the first software module certified for game play by a certification authority independently of the second software module.

15. The method of claim 12, further comprising having the second software module pre-certified and used with any certified first software module.

16. The method of claim 12, further comprising communicating with an external server via the second software module.

17. The method of claim 16, wherein said communicating with an external server is done using one of a SAS protocol and a G2S protocol.

18. The method of claim 12, further comprising having the first software module and the second software module communicate together via an application programming interface.

19. The method of claim 12, wherein said interacting with non-game related hardware devices comprises:

using an input/output sub-module for communicating with input and output passive components;

using an external devices sub-module for communicating with external devices; and using a directly connected devices sub-module for communicating with directly connected devices.

20. The method of claim 12, further comprising accessing said second software module for tasks that are common from one game to another.

21. A non-transitory computer readable medium having executable computer program instructions stored thereon and embodying an intermediary software module, for execution by a processor to perform steps of:

communicating with a reduced game application for a specific game within a gaming system, the reduced game application being independent from the intermediary software module;

interacting with game and non-game related hardware devices internal and external to the gaming system for interfacing the reduced game application with an environment outside of the reduced game application;

receiving data indicative of at least one event from the outside environment;

in accordance with the received data, deciding next steps to be taken as a function of a given state of the gaming system and generating output data accordingly; and communicating the output data to the reduced game application for altering a play of the specific game.

22. The intermediary software module of claim 21, further comprising:

an input/output sub-module for communicating with input and output passive components;

an external devices sub-module for communicating with external devices; and a directly connected devices sub-module for communicating with directly connected devices.

23. A network in a gaming environment comprising:

at least one gaming system for use in a gaming environment, the gaming system comprising:

a game application comprising a first software module containing instructions for running a specific game, the instructions related to the behavior, personality, and presentation associated with the specific game;

a second software module independent from the first software module and adapted to interact with game and non-game related hardware devices for interfacing the first software module with an environment outside of the first software module to receive data indicative of at least one event from the outside environment, and, in accordance with the received data, to generate and communicate to the first software module output data for altering a play of the specific game;

a set of hardware devices for game and non-game related events; and an operating system to control the set of hardware devices in order to allow users and the game application to make use of them; and at least one server in communication with the gaming system via the second software module, the at least one server and the second software module adapted to communicate using a given communication protocol, whereby the second software module is adapted to relay information from the first software module to the server and from the server to the first software module.

* * * * *